to all such methods and processes and to all materials to which they are applicable, 10 Claims, No Drawings may be applied.

United States Patent [19]
Wyndham et al.

[11] 4,082,833
[45] Apr. 4, 1978

[54] CLAY HALOGENATION PROCESS

[75] Inventors: Ronald Wyndham, New Orleans; John Christopher Terry, Metairie, both of La.

[73] Assignee: Toth Aluminum Corporation, New Orleans, La.

[21] Appl. No.: 646,889

[22] Filed: Jan. 6, 1976

[51] Int. Cl.$^2$ .............................................. C01G 15/00
[52] U.S. Cl. .................... 423/135; 423/137; 423/341; 423/343; 423/76; 423/79; 423/496; 423/136
[58] Field of Search ............... 423/76, 79, 135–137, 423/149, 492, 493, 495, 496, 341–343; 75/111–113

[56] References Cited
U.S. PATENT DOCUMENTS

| | | | |
|---|---|---|---|
| 2,127,240 | 8/1938 | Stott | 423/38 |
| 3,244,509 | 4/1966 | Nowak et al. | 75/112 |
| 3,861,904 | 1/1975 | Othmer | 423/495 |

OTHER PUBLICATIONS

Chemical Abstracts, vol. 55, Nos. 14223d,f, 20346, (1961).

*Primary Examiner*—O. R. Vertiz
*Assistant Examiner*—Brian E. Hearn
*Attorney, Agent, or Firm*—Holman & Stern

[57] ABSTRACT

One of the major obstacles toward the needed and economic production of alumina and other values from kaolinitic clay and other ores by chlorination has been the slow reaction rates and low yields of the metal values. The present invention provides methods for improving reaction rates and/or yields in the halogenation of various ores which comprises the addition of sulfur and/or functionally equivalent sulfur containing compounds as an ore conditioning agent and/or reaction promoter. These improvements also permit operation at low temperatures with advantage of savings of energy and of equipment and maintenance costs. The invention is applicable to both displacement halogenation and carbo-halogenation processes. The sulfur and/or functionally equivalent sulfur containing compounds can be added to the reaction mass during pre-halogenation steps or to the halogenation step or to combinations of steps ordinarily with additional benefits. The preferred embodiments are directed toward the carbochlorination of ores with illustrative examples given for clay, bauxite, ilmenite and aluminum phosphate; and for displacement chlorination of ores with illustrative examples given for hematite and ilmenite.

10 Claims, No Drawings

CLAY HALOGENATION PROCESS

BACKGROUND OF THE INVENTION

The reserves of high grade ores on which many current chemical and metal industries are based, are fast disappearing with rapid rises in price. A major thrust of mankind therefore must be the development of economic processes to utilize abundant low-grade ores.

The aluminum and titanium industries are illustrative of such a situation insofar that high grade bauxite and titaniferous ores represent limited reserves with soaring prices. Ordinary clay provides a virtually inexhaustible reserve for both the aluminum and titanium industries.. Ore chlorination processes offer a potentially economic means to remove and recover valuable metals as volatile chlorides, but with clay for instance, a major obstacle has been the low rates of chlorination and the low yield of aluminum chloride. The present invention comprises a new, novel and needed method to greatly and economically increase chlorination reaction rates and yields of values from clay and other ores and at low temperatures.

The present invention relates to the halogenation of metallic ores to make metallic halides. More specifically, the instant invention is primarily concerned with the carbo-chlorination and displacement chlorination reactions of metallic ores in the presence of sulfur and/or one or more functionally equivalent sulfur containing compounds which serves as a conditioning agent and/or a reaction promoter whereby the rate of reaction and yield of values are enhanced.

Discussion of Prior Art

Processes for the conversion of various metallic ores into metallic halides by what is known as reduction and displacement chlorination are old and well known in the art. The use of sulfur and/or sulfur containing compounds as reducing agents in reduction halogenation processes is also well known and documented in the technical literature and various patents have issued thereon. For example, U.S. Pat. Nos. 1,858,272; 1,422,568; and 1,405,115 disclose processes for chlorinating clay and alumina utilizing mixtures of chlorine and sulfur or sulfur chlorides. U.S. Pat. Nos. 1,851,272 and 1,325,203 describe the chlorination of aluminous materials using chlorine, carbon disulfide and various compounds of sulfurous and carbonaceous reduction chlorination reactants. However, in all of the cited cases as disclosed therein and as apparent from the stoichiometry involved, sulfur in elemental form or combined with carbon was used solely as a reducing agent, and in any event, was thus a principal reactant in the chlorination reaction. In any event, it is manifestly clear that in those prior art processes, the sulfur is clearly used for, and is consumed stoichiometrically by metal oxide reduction, a teaching far removed from the present invention's use of even small amounts of sulfur to unexpectedly improve the reaction rates and yields of values as a conditioner of the reaction mass and/or as a reaction promoter without the prior art mandatory consumption of the sulfur.

SUMMARY OF THE INVENTION

A primary objective of the present invention is to provide metallic ore halogenation processes for the production of metallic halides utilizing sulfur and/or functionally equivalent sulfur containing compounds as a conditioning agent and/or as a reaction promoter.

A principal objective of the present invention is to produce metal chlorides at a greater reaction rate and/or yield by the carbo-chlorination of metal ores using sulfur and/or functionally equivalent sulfur containing compounds as a conditioning agent and/or as a reaction promoter.

Another principal objective of the present invention is to produce metal chlorides at a greater reaction rate and/or yield by the displacement chlorination of metal ores using sulfur and/or functionally equivalent sulfur containing compounds as a conditioning agent and/or as a reaction promoter.

Yet another principal objective of the present invention is to produce metal chlorides at low reaction temperatures by utilizing sulfur and/or functionally equivalent sulfur compounds in carbo-chlorination reactions of metal ores.

Among the many advantages and features of the present invention is the provision for the first time of a commercially feasible process involving the conversion of metallic ores into metallic halides, specifically an aluminum halide, and especially, aluminum chloride, at reaction rates and yields heretofore unrealized in the prior art. The aluminum chloride produced pursuant to the present process can be readily oxidized to produce alumina more economically overall than present alumina producing techniques. Also among the distinguishing advantages and features of the present invention is the fact that by conditioning an ore pursuant to the present invention, a reactive ore can be produced under conditions that would normally render it unreactive as taught by the prior art.

The above objectives together with other distinguishing features and advantages of the instant invention will be apparent to one skilled in the art in light of the ensuing detailed disclosures of its preferred embodiments and which are also distinctly claimed hereinafter.

DESCRIPTION OF THE PREFERRED EMBODIMENT(s)

As brought out above, the improved process of the present invention involves the initial calcination and subsequent carbo-halogenation or displacement halogenation reaction of various ores in the presence of sulfur and/or functionally equivalent sulfur containing compounds. As an example of carbo-halogenation, the carbo-chlorination of calcined clay is given by the following:

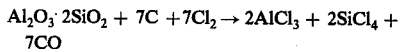

$$Al_2O_3 \cdot 2SiO_2 + 7C + 7Cl_2 \rightarrow 2AlCl_3 + 2SiCl_4 + 7CO$$

As the above reaction is written, the carbon is consumed to form carbon monoxide, however, some carbon dioxide will also generally form depending on the specific reaction conditions. At 1000° K the free energy of the above reaction is about $-71$ Kcal and thus the reaction would be expected to proceed as written. The kinetics or rate of the reaction can only be determined experimentally, and in spite of the highly favorable free energy it has been found that the reaction is slow and does not proceed to completion.

As an example of displacement halogenation, the reaction of ferric oxide with silicon tetrachloride is given by the following equation:

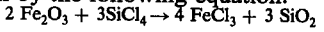

$$2 Fe_2O_3 + 3SiCl_4 \rightarrow 4 FeCl_3 + 3 SiO_2$$

The free energy, ΔG, of the above reaction at 1100° K, is −108Kcal and thus the reaction would be expected to proceed rapidly. Experimental tests have shown, however, that the rate of the displacement reaction is slow.

Pursuant to the discovery of the present invention, it has been found that the above ore halogenation processes are eminently enhanced by the addition of sulfur and/or functionally equivalent sulfur containing compounds to the reactants at various stages of the process sequence as defined below. Unexpected results are obtained using a wide variety of metallic ores under varying conditions unlike the confining limitations of the prior art as discussed supra.

The mechanism by which sulfur acts as a reaction promoter and/or as a reactant conditioner in the above calcination and chorination reactions has not been fully established. However, while not wishing to be bound by theory, it is believed that the active reaction promotion and/or reactant conditioner is elemental sulfur. In a hot reaction system, many sulfur materials in the chemical classes listed hereinafter will thermally or chemically decompose to yield sulfur either directly or indirectly through a series of reaction steps. Thus, any sulfur containing compound which is decomposable by heat, carbon, chlorine, or a combination thereof, viz., under the conditions of the present process, to yield elemental sulfur is a potential reactant conditioner and/or reaction promoter.

The term "reaction promoter" comprises one of the apparent functions of sulfur and/or functionally equivalent sulfur compounds as a catalytic agent relative to improvement in reaction rates achieved in the present invention and also commonly results in a higher yield of values.

The term "reactant conditioner" means the treatment of the ore with the sulfur and/or functionally equivalent sulfur compounds before chlorination so that the ore is rendered more reactive resulting in better reaction rates and yields even when the sulfur is vaporized prior to the chlorination proper. These functions of the sulfur employed in the process of the instant invention represent an outstanding distinguishing feature.

As well recognized in the art, many ores as clay contain chemically bound water which must be almost completely removed by calcination in the temperature range of about 600° C to 1000° C before the ore can be satisfactorily chlorinated. This step is, however, sensitive to such variables as temperature, composition of vapor phase, time, rate of water removal, etc. It is to be recognized that an ore can be rendered less reactive, or even unreactive, depending on specifically how the calcination is carried out. It has been found pursuant to the present discovery that calcination in the presence of sulfur materials, however, can condition the ore such that a reactive ore is produced under calcination conditions which would otherwise have produced a much less reactive ore. This is particularly true when employing common aluminum bearing clay, especially kaolinitic clays, yet it has been found that it is also very desirable in certain instances to add sulfur and/or functionally equivalent sulfur containing materials to only the carbo-chlorination step to achieve considerably higher rates and yields, but the best results are achieved under certain conditions by adding the sulfur to both pre-chlorination and carbo-chlorination steps. The most desirable steps for introduction of sulfur and/or functionally equivalent sulfur compounds will become apparent to one skilled in the art after obvious routine testing according to principles of this invention as disclosed herewith.

As brought out above, the carbo-chlorination of various metallic ores represents a preferred embodiment of the present invention. In the carbo-chlorination reaction of materials such a clay, bauxite, ilmenite, and aluminum phosphate it has been found that without the addition of sulfur materials pursuant to the process of the present invention, the rate of reaction is generally much slower and that frequently one or more of the components of these ores will not chlorinate in high yields even with long reaction times. However, upon the addition of one or more sulfur compounds selected from the chemical classes defined and as taught herein, the rate of reaction increases significantly and much improved yields are observed.

As further brought out above, the present invention further embraces as a preferred embodiment the displacement chlorination of metallic ores. More specifically, what is encompassed within the ambit of that embodiment is the reaction of metal chlorides with a metal oxide such that a double-substitution reaction occurs. In this way the metal oxide is converted to a metal chloride product. It has also been found that the addition of sulfur material to this type of reaction as taught herein results in a significant increase in not only the rate of reaction, but also the extent of yield of the metal chloride product.

The improved processes of the present invention can be carried out pursuant to various well known chemical processing techniques utilizing conventional types of reaction equipment. Accordingly, different types of apparatus that can be employed are shallow bed reactors, shaft reactors, fluid and static bed reactors, rotary reactors or the like. Of course, the type of process equipment selected will invariably in turn affect the determination of various process parameters. Moreover, the basic conditions required for a given reaction will also vary depending not only upon the processing equipment employed, but additionally, upon the specific ore and other reactants.

The carbo-chlorination reaction of the present invention as particularly exemplified by the working examples enumerated below is conducted within a temperature range of from about 400° C to about 1000° C, but it is noteworthy that a beneficial feature of the present invention is the fact that it can be conducted at relatively lower temperatures than heretofore generally employed in the art of chlorination of clays while concomitantly realizing signficantly higher yields and reaction rates. The low temperature range is from about 600° C to about 800° C and particularly around 700° C when employing the preferred process sequence, reactants and conditions of the present invention. Conducting the present process at these temperature conditions simplifies the selection and operation of process equipment.

Another salient feature of the instant invention is the fact that it can be carried out at essentially atmospheric pressure which represents a preferred embodiment of the present invention. Pressures less than 100psi are satisfactory, especially from about 15psi to about 40psi. These and other elegant advantages and features of the present invention will come to light as the discussion proceeds.

The amount of sulfur or sulfurous material utilized to realize the advantages of the present invention can vary considerably depending on the specific process step and on the operating conditions being utilized. It is to be noted that where sulfur is introduced into the initial stage (pre-chlorination) of the present process(es) as a reactant conditioner, it is effective in small amounts, far less than stoichiometric, and up to 30% or more by weight of the ore. The sulfur in this step does not significantly react with nor is it significantly consumed by the metals or oxygen content of the ore under the prescribed range of operating conditions. The sulfur also could not be significantly retained as such in the ore since the calcination is run above the boiling point of sulfur. Generally, the preferred amounts of sulfur required for satisfactory conditioning of the ore will be less than 15% and preferably less than 5% by weight of the ore. However, it is recognized that the concentration of sulfur needed for optimum ore conditioning can vary depending on the ore, calcination conditions, and equipment being used.

The above non-consumption of sulfur by the metal oxides in ore components also applies to displacement chlorination reactions since this type of reaction does not generally involve any oxidation-reduction processes. Thus sulfur added to a displacement or double substitution reaction can have no function other than as a reaction promoter and/or as a reactant conditioner and therefore can be added in such amounts as needed for optimization of reaction rates and yields without reference whatsoever to any reductant or stoichiometric basis.

The prior art taught the use of sulfur only as a reductant in chlorination, so it is very significant that the present invention's reactant conditioning and improvement in displacement chlorination, function entirely free of any of the sulfur reduction reactions and teaching of the prior art; the oxygen in the metal oxides of the ore is not combined with carbon or sulfur in calcinations or displacement chlorination. Only a novel and unexpected reactant conditioning or reaction promotion could occur in the present invention, completely divorced from the prior art.

Clearly, sulfur in carbo-halogenation must be acting also essentially as a reaction promoter and not as the reducing agent taught in the prior art because of the workability of such sulfurous materials as sulfur dioxide and various sulfates and oxygen-containing sulfur compounds described hereinafter. In such cases the sulfur is already in an oxidized form and therefore could not react with the ore to remove oxygen and to act as a reducing agent. Likewise, elemental sulfur would not act substantially as a reducing agent in the presence of carbon since carbon thermodynamically reduces sulfur dioxide to sulfur under conditions of the carbohalogenation processes, hence sulfur is maintained substantially as such instead of acting as a reductant. Thus in the presence of sufficient carbon for carrying out carbo-halogenation, sulfur will act substantially and primarily as a reaction promoter compatible with the established non-reducing action of the sulfur in the aforementioned calcination and displacement chlorination application.

The scope of this invention would include any amount of sulfur which is generated or introduced and retained in the elemental form under the particular chlorination or calcination process involved, hence could not serve as a reductant. Amounts of 20-30% sulfur thus could be used in carbo-chlorination when carbon supplied all the necessary reductant, but excess sulfur over that needed for reaction promotion represents extra expense in condensing and recycling the sulfur. Therefore, amounts below about 10%, and especially below about 3% are the preferred embodiment of this invention. These preferred embodiments represent but a very small fraction of that required for complete reduction of ore and are far removed therefrom, but have a remarkable effect on reaction rates and yields as shown in the working examples presented herein.

As postulated above, it is presumed that the sulfur influences the present process by virtue of its presence in its elemental form whether it be initially present in such form or added in some compound form where the sulfur variety is reduced to its elemental form. The various forms of sulfur can be added at any time and in any combinations consistent with the above teaching.

Besides elemental sulfur, exemplary of the sources of sulfur that may be employed in one or more of the process steps of the present invention as long as the particular source is decomposable under the selected reaction conditions to yield elemental sulfur, viz. realizes sulfur in a form which allows the present process to proceed, are: sulfides, e.g. sodium sulfide, hydrogen sulfide, iron sulfide, carbon sulfide, calcium sulfide, or the like; sulfates, e.g. sodium sulfate, calcium sulfate, potassium pyrosulfate, aluminum sulfate, iron sulfate, sodium thiosulfate or the like; sulfur halides, e.g., sulfur monochloride, sulfur dichloride, sulfur tetrachloride, or the like; sulfur oxides, e.g., sulfur monoxide, sulfur sesquioxide, sulfur dioxide, sulfur trioxide, sulfur heptoxide, sulfur tetraoxide, or the like; sulfur oxyhalides, e.g. sulfur monoxytetrachloride, sulfur trioxytetrachloride, or the like; sulfuryl halides, e.g. sulfurylchloride, sulfuryl pyrochloride, or the like, as well as various other sulfur containing compounds, e.g. thiocarbonyl chloride, thiocarbonyl tetrachloride, thionyl chloride, or the like. Of the above compounds, elemental sulfur is especially preferred for use in the carbo-chlorination or the displacement chlorination reaction as it is readily available in the pure form and hence offers an economically advantage regardless of which process technique is employed.

Aside from the use of elemental sulfur, in general, the selection of a specific sulfur reaction promoter and/or reactant conditioner will largely depend upon the type of ore and reaction conditions selected pursuant to the particular process technique being employed, coupled with the overall economics, availability, and cost of given sulfur compounds.

Powdered carbon as derived from, e.g., fossil sources, vegetable sources or the like and which are readily commercially available, are preferably employed as the carbon reactant in the above carbo-chlorination reaction, Also, carbon formed on the surfaces of the ore by pyrolysis of hydrocarbon vapors is suitable.

The halogen reactant can be any pure halogen or halogenated compound capable of reaction in a carbohalogenation or displacement reaction with ore oxides. Dry chlorine is preferred in carbo-halogenation since it is inexpensive and readily commercially available. Likewise, for a displacement reaction, a metal halogen compound such as aluminum chloride, silicon chloride, titanium chloride, or the like can be employed, viz., any metal halogen compound capable of reacting with the ore oxides.

The general requirement for a suitable displacement chlorinating agent for the reaction is that the metal chloride reactant added to the ore must displace the oxygen from the desired metal oxides in the ore to convert the latter to chlorides while the additive metal chloride is converted to an oxide, viz., a double decomposition occurs in which the chlorine and oxygen exchange metal constituents. Typical reactions of this type are the reaction of silicon chlorides with iron oxide to form silicon oxide and iron chloride, titanium chlorie with iron oxide to form titanium oxide and iron chloride, aluminum chloride with iron oxide to form aluminum oxide and iron chloride, silicon chloride with titanium oxides to form silicon oxide and titanium chloride, etc. A study of the thermodynamics of metal oxides and chlorides by one skilled in the art would give a more complete listing of those combinations which could be reacted together as taught herein and tables have been published showing the rank in chlorine affinity of metal oxides.

The utility of displacement chlorination reactions can be found in many different areas: For example, in clay carbo-chlorination the silicon chloride produced could be waste material if produced in large quantities. However, is taught herein, this silicon chloride can be used to produce high grade iron chloride from low grade iron ores thus converting what would have been an economic loss into a profitable product. Likewise a whole series of contaminated or low grade ores could be up-graded by chlorinating out undesirable impurities. Further, by selecting the proper chlorinating agent certain valuable trace components could be selectively chlorinated without the costs of chlorinating the entire ore. Thus it can be seen that there are a wide variety of displacement chlorination reactions that now become of commercial interest and that to increase the rate and yield of these reactions through use of sulfurous reactant conditioners and reaction promoters is of real economic significance and represent a breakthrough in the art.

To further demonstrate the process of this invention, the following examples are presented wherein all parts and percentages are by weight unless otherwise specified.

EXAMPLES 1 – 6

A series of carbo-chlorination reactions tabulated below were carried out in shallow boats placed in a one inch diameter horizontal tube furnace using a readily available clay containing 38% $Al_2O_3$, 44% $SiO_2$, 1.5% $Fe_2O_3$, 2.0% $TiO_2$, and 14% $H_2O$. In each example the clay was first dried at 140° C for two hours to remove free water and thereafter was ground to −200 mesh. The ground clay was then mixed with 40% by weight of powdered carbon and from 0 to 9% elemental sulfur by weight. The resulting mixture was bound together using a 2% by weight starch solution and thereafter calcined in a boat at 700° C for one hour under a nitrogen purge to remove additional free water and chemically bound water. After calcination, the reaction mixture containing about 0.5 gram of clay was chlorinated in situ in the same reaction boat for 15 minutes at 700° C with pure chlorine at a flow rate of 170 cc/min. The results of these carbo-chlorination example reactions are summarized in the table below:

| EXAMPLE | % ELEMENTAL SULFUR ADDED | % Chlorination In 15 Minutes | | | |
|---|---|---|---|---|---|
| | | $Al_2O_3$ | $SiO_2$ | $Fe_2O_3$ | $TiO_2$ |
| 1 | 0.0 | 66.5 | 62.9 | 76.4 | 78.5 |
| 2 | 0.1 | 81.9 | 83.8 | 100.0 | 100.0 |
| 3 | 0.3 | 92.0 | 92.0 | 100.0 | 100.0 |
| 4 | 1.0 | 96.1 | 92.2 | 96.0 | 100.0 |
| 5 | 5.0 | 94.5 | 89.5 | 94.5 | 100.0 |
| 6 | 9.0 | 92.6 | 92.9 | 98.1 | 100.0 |

It is obvious from the above results in comparing the poor results of comparison Example 1 to those of working Examples 2 through 6, that elemental sulfur not only causes a significant increase in the rate of chlorination of clay, but additionally that such beneficial effect is observed over a wide range of sulfur levels. On the average, it can be seen that the addition of elemental sulfur in the range of 0.3% to 9.0% increases the chlorination rate of $Al_2O_3$ by 41%, of $SiO_2$ by 46%, of $Fe_2O_3$ by 27% and of $TiO_2$ by 27%. Additionally, it was observed that at longer reaction times, the reaction run of Example 1 with no sulfur added did not result in higher conversion of $Al_2O_3$. Thus, the addition of elemental sulfur to the reactions of Examples 2 through 6 resulted not only in higher chlorination rates, but also resulted in a higher yield of $AlCl_3$, the most valuable reaction product. Without the use of sulfur, about 50% more of the costly calcined clay-carbon mix would be required for the same production of $AlCl_3$. The yields of valuable by-product chlorides of $Fe_2O_3$ and $TiO_2$ also were importantly increased which also represents an ancillary advantage and feature of the present process.

In the above working examples, substitution of sodium thiosulfate for elemental sulfur produces similar results. When the above experiment is repeated utilizing bromine as the halogenating material, beneficial results are also realized.

EXAMPLES 7-11

EXAMPLES 7-11

Another series of carbo-chlorination examples were carried out in the same manner and with the same raw clay as described in Examples 1 through 6 above except that the specific procedure for adding the elemental sulfur to the reaction was varied. In each example, 0.5 gram samples of dried clay were mixed with 40% by weight of powdered carbon, 5% by weight of elemental sulfur, and a sufficient amount of a 2% starch solution to bind the reactants together. In Example 7, the clay, carbon, sulfur, and starch solution were mixed together and the resulting mixture was calcined for 1 hour at 700° C under an inert gas purge. The resultant mass was then chlorinated for 15 minutes with pure chlorine at a flow rate of 170 cc/min. In Example 8, the dried clay was mixed with 5% sulfur and calcined as usual. Thereinafter the carbon and binder were added and the chlorination was carried out as described above. In Example 9, the dried clay was mixed with carbon and binder and then calcined. After calcination 5% sulfur was added to the reaction mixture and the chlorination was carried out as usual. In Example 10, dried clay was calcined alone and the 40% carbon, 5% sulfur, and binder were added just before the chlorination reaction. In Example 11, the dried clay was mixed with carbon and binder before calcination and no sulfur was added to any step of the process. Thus, Examples 7 and 11 are the same result except that Example 11 contains no sulfur additive. The results of Examples 7 through 11 are summarized in the table presented below.

| EX-AMPLE | % Chlorination in 15 Minutes | | | |
|---|---|---|---|---|
| | $Al_2O_3$ | $SiO_2$ | $Fe_2O_3$ | $TiO_2$ |
| 7 | 94.5 | 89.5 | 94.5 | 100.0 |
| 8 | 87.7 | 78.3 | 93.1 | 100.0 |
| 9 | 91.5 | 80.0 | 88.8 | 100.0 |
| 10 | 86.7 | 83.5 | 100.0 | 96.7 |
| 11 | 66.5 | 62.9 | 76.4 | 78.5 |

In comparing the results of the above Examples 7 thru 11, it can be seen that the chlorination rates of the components in clay vary somewhat depending on the specific method utilized for preparing the reaction mixture. However, the chlorination rates for Examples 7 through 10 with sulfur were significantly higher than for Example 11 which was conducted without sulfur. Thus, it can be appreciated from the above results that the elemental sulfur can be introduced into the reaction by any of several means. In light of the present disclosure, additional methods will become obvious to one skilled in the art of carbo-chlorination reactions such as introducing the elemental sulfur or sulfur compound in a vaporous form into the calcination step or the carbo-chlorination step.

In working Examples 7 through 10 above, when sulfur dioxide is employed during the calcination step in the presence of carbon, and hydrogen sulfide is employed during chlorination, similar conversion percentages are also realized.

EXAMPLES 12–18

In the following examples, various sulfur compounds were employed pursuant to the same process sequence as utilized in the previous working examples. Moreover, the same clay was employed using shallow boats in a horizontal tube reactor. In each of Examples 12 through 18, about 0.5 gram of clay was first dried at 140° c for two hours and then ground to −200 mesh. The ground clay was thereafter mixed with 40% powdered carbon by weight and a 2% starch solution as a binder. The bound mixtures were then calcined at 700° C for 1 hour under an argon or nitrogen gas purge. In Example 12, sodium thiosulfate ($Na_2S_2O_3$) was added in sufficient quantity to make the net amount of contained sulfur about 4% by weight of the clay. In Example 15, ferrous sulfide (FeS) was added in sufficient quantity to make the net amount of contained sulfur 1% by weight of the clay. The resulting clay-catalyst mixtures were then chlorinated for 15 minutes using pure chlorine at a flow rate of 170cc/min. In Examples 13 and 14, the calcined mixtures were taken as is and placed in the reactor but with the addition of 25 cc/min of gaseous $H_2S$ in Example 13 and 25 cc/min of gaseous $SO_2$ in Example 14 as additives to the 170 cc/min stream of chlorine. The reactions containing the $H_2S$ and $SO_2$ gases were also reacted for 15 minutes. In Examples 16 and 17, the calcined mixtures were chlorinated concomitantly with the addition of liquid sulfuryl chloride ($SO_2Cl_2$) and liquid sulfur monochloride ($S_2Cl_2$), respectively, to the 170 cc/min chlorine gas stream entering the reactor. The $S_2Cl_2$ and $SO_2Cl_2$ were added over the 15 minute reaction time and were carried into the reactor by the flow of chlorine gas. The results of the above examples are summarized in the table below.

| EX-AMPLE | CATALYST | % Chlorination in 15 Minutes | | | |
|---|---|---|---|---|---|
| | | $Al_2O_3$ | $SiO_2$ | $Fe_2O_3$ | $TiO_2$ |
| 12 | $Na_2S_2O_3$ | 91.9 | 89.7 | 90.0 | 100.0 |
| 13 | $H_2S$ | 84.3 | 87.4 | 89.5 | 100.0 |
| 14 | $SO_2$ | 87.6 | 83.6 | 90.4 | 96.2 |
| 15 | FeS | 84.5 | 78.6 | 100.0 | 100.0 |
| 16 | $SO_2Cl_2$ | 89.4 | 86.5 | 100.0 | 100.0 |
| 17 | $S_2Cl_2$ | 80.4 | 85.9 | 100.0 | 100.0 |
| 18 | NONE | 66.5 | 62.9 | 76.4 | 78.5 |

It can be appreciated from the above results, that sulfurous compounds, as well as elemental sulfur, have an unexpected catalyzing effect on the carbo-chlorination of common clay. Further, it is to be noted that although in the experimental runs utilizing $H_2S$ and $SO_2$, that while the amount of contained sulfur that flowed thru the tube was essentially equal in weight to the clay, the actual amount of sulfur that contacted the clay in the boats was only about 10% by weight of the clay as this is characteristic of the type of reactor employed. In any event, the addition of the solid sulfur containing material to the clay, or gaseous sulfur compounds to the chlorine, produces the highly beneficial catalytic effect.

EXAMPLES 19–21

The following three carbo-chlorination reactions were carried out in a 40 mm. diameter batch fluid bed reactor using the same common clay described in the previous experiments. A charge of about 16 grams of dry clay was first ground to −200 mesh and was mixed with an equal weight of powdered carbon and sufficient 2% starch solution to bind the mixture together. To the mixture of Example 19 was added powdered sulfur equal to 5% by weight of the clay used. All three mixtures were then calcined in the fluid bed reactor at 700° C for 45 minutes under a purge of 200 cc/min argon and 100 cc/min carbon monoxide to remove additional free water and chemically bound water. During calcination it was observed that the bulk of the sulfur added to Example 19 was vaporized out of the reaction mixture. After calcination, but before chlorination, the three reaction mixtures were treated chemically to remove most of the $Fe_2O_3$ content of the clay. The thus purified mixtures were then chlorinated at 900° C for 30 minutes with a stream of chlorine at a flow rate of 400 cc/min. To the mixture of Example 19, calcined in the presence of sulfur and to the mixture of Example 20 calcined without sulfur, a stream of 2 cc/min $H_2S$ was mixed with the chlorine during the chlorination reaction. No $H_2S$ was added to Example 21. The results of these three fluid bed carbo-chlorination experimental examples are given below:

| EX-AMPLE | ADDITIVE | % Chlorination in 30 Minutes | | | |
|---|---|---|---|---|---|
| | | $Al_2O_3$ | $SiO_2$ | $Fe_2O_3$ | $TiO_2$ |
| 19 | $S + H_2S$ | 93.5 | 93.5 | 100.0 | 100.0 |
| 20 | $H_2S$ | 55.8 | 66.7 | 97.0 | 100.0 |
| 21 | NONE | 46.8 | 57.7 | 100.0 | 100.0 |

In Examples 20 and 21 above to which no elemental sulfur ws added before calcination, the reaction mass was further chlorinated for an additional 30 minutes, however, the reaction had ceased and no additional product was obtained. Thus, it can be seen that the use of sulfur in combination with $H_2S$ in the experimental run of Example 19 gave a higher reaction rate and yield over the results of Example 20, 21 wherein no sulfur or H₂S was added and also gave significant improvement over the results of Example 20 wherein only H₂S was added during chlorination. These results illustrate an unexpected beneficial action of adding sulfurous materials to both the calcination and chlorination steps. However, based on the tests carried out in shallow boats, it would have been expected that a sulfurous material would have been needed only in either the calcination or in the chlorination phases, but not in both. It has been noted, however, that in carrying out calcination reactions in different equipment, it has been found that the clay is rendered less reactive which is probably due to a less efficient removal of chemically bound water than would be achieved in shallow beds. Presumably, while not wishing to be bound to theory, the addition of sulfur-to-the clay before calcination prevents the clay from becoming unreactive. Thus, depending on the specific size and type of apparatus being utilized, it may not only be desirable, but also necessary to economics to add a sulfurous material to both the calcination and chlorination steps.

To further demonstrate the desirability of adding a sulfurous material to both the calcination as well as the chlorination steps of the present process, the following fluid bed reactor experiments were conducted.

EXAMPLES 22-25

The same clay as employed above in Examples 1-6 was utilized in these examples. The clay was first dried by heating to 140° C to remove excess water and thereafter ground to −200 mesh. The ground clay was then mixed with powdered carbon and elemental sulfur in thos examples as indicated. Thereafter the reaction mass was bound together using a 2% starch binder and again comminuted to break up agglomerate formed by the binder. The resultant mass was then calcined by heating to 700° C and held at that temperature for 35 minutes under a flow of argon. After calcination the temperature of the reactant mass was increased under a flow of argon. Upon obtaining a temperature of 800° C, the flow of argon gas was interrupted and the gases shown in the following tabulation were added as indicated to chlorinate the reactant mass for 25 minutes while the temperature was held at 800° C.

been added in calcination was 23.3% (Examples 22 and 23, 91.2 − 67.9 = ), giving a gratifying total conversion of Al₂O₃ of 91.2% or gain of 91.2% − − 39.6 = 51.6% over the use of no sulfur at all. By the use of sulfur, the overall conversion was increased a remarkable 2.3 times, 91.2/39.6.

The following additional working examples illustrate the unique and unexpected discovery of the present invention in its application involving a displacement type of reaction.

EXAMPLES 26 and 27

In Example 26, a 0.5 gram sample of hematite ore containing 77.5% Fe₂O₃ by weight was placed in a shallow boat in a horizontal tube reactor. Silicon tetrachloride gas was flowed over the boat at 800° C for 30 minutes at a flow rate of one gram of SiCl₄ per minute. At the end of 30 minutes, 72.1% of the initial Fe₂O₃ content had been chlorinated to form FeCl₃. For comparison, Example 27 was conducted utilizing a 0.5 gram sample of the same hermatite ore which was mixed with 0.005 grams or 1% by weight of powdered sulfur. The mixture was then placed in a shallow boat in a horizontal reactor for 10 minutes at 800° C and exposed to SiCl₄ gas at a flow rate of 1 gram per minute. At the end of 10 minutes, 93.5% of the initial Fe₂O₃ content had been chlorinated.

As can be readily appreciated from the above results, the Fe₂O₃ in Example 27 reacted to a greater extent in one-third the time such that the sulfur caused the reaction rate to be faster by a factor of 3.9. ASsuming arguendo, that if the sulfur was reacting with the Fe₂O₃ to form Fe₂S₃ or was acting as a reducing agent to form SO₂, it would have been necessary to add the sulfur in such an amount that the hematite-sulfur mixture would contain 30% sulfur by weight. However, the ore contained only 1% added sulfur and thus, it becomes evident that it acts as a reactant conditoner and/or a reaction promoter, and in any event, not as a reducing agent.

EXAMPLE 28

To further illustrate the unique advantages of the instant invention, the following experiment demonstrates the use of bauxites as an ore. As recognized in the art today, bauxites can be carbo-chlorinated using coke

| Example | Elemental Sulfur Added During Calcination | Sulfur Added During Chlorination | Chlorinaton Gas | Al₂O₃ | SiO₂ | Fe₂O₃ | TiO₂ |
|---|---|---|---|---|---|---|---|
| 22 | 5% | 2 cc/min H₂S | Cl₂ | 91.2 | 94.2 | 100 | 95.6 |
| 23 | 5% | 0 | Cl₂ | 67.9 | 57.3 | 88.2 | 76.5 |
| 24 | 0 | 2 cc/min H₂S | Cl₂ | 59.4 | 66.7 | 95.6 | 61.7 |
| 25 | 0 | 0 | Cl₂ | 39.6 | 10.2 | 97.0 | 78.4 |

In Example 25, it was observed that no more product evolved after 10 minutes, however, the gas flow was allowed to proceed for 25 minutes. In each example, after the stated reaction time, the reaction mass was cooled and analyzed to show residual metals from which the conversion was calculated as shown in the above tabulation.

It is seen from the above results in the fluid bed that the biggest single gain in Al₂O₃ conversion results from addition of sulfur in calcination (Examples 23 and 25, 67.9 − 39.6 = 28.3%). The gain in Al₂O₃ conversion from adding sulfur only to chlorinate was 19.8%, Examples 24 and 25, 59.4 − 39.6 = ). The gain in conversion from adding sulfur to chlorination after sulfur had and chlorine or carbon monoxide and chlorine according to the following equations after calcination to remove moisture:

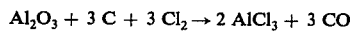

$$Al_2O_3 + 3\ C + 3\ Cl_2 \rightarrow 2\ AlCl_3 + 3\ CO$$

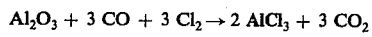

$$Al_2O_3 + 3\ CO + 3\ Cl_2 \rightarrow 2\ AlCl_3 + 3\ CO_2$$

When carbon is used as the reducing agent, various amounts of CO₂ might be produced depending on the specific reaction conditions. Another major component of most bauxite ores is iron, usually present as Fe₂O₃ or Fe₃O₄. The level of iron can range from about 5% to 40%. TiO$_2$ and SiO$_2$ are also usually present in small percentages.

Pursuant to the process of the present invention, it has been found that a sulfurous material when added to the bauxite during carbo-chlorination results in a sizable increase in reaction rate. As was illustrated above in the carbo-chlorination of common clay, the sulfurous material can comprise elemental sulfur, sulfur dioxide, hydrogen sulfide, sulfur monochloride, sulfuryl chloride, sodium thiosulfate, or other similar sulfur containing materials.

The bauxite ore which contained 3707% Al$_2$O$_3$, 30.2% Fe$_2$O$_3$, 7.0% TiO$_2$, and 5.5% SiO$_2$ was calcined to remove chemically bound moisture and thereafter mixed with 25% carbon. Two samples, one containing 1% elemental sulfur and one without sulfur, were reacted with chlorine at 800° C for 15 minutes. The sample containing sulfur resulted in chlorination of 74.6% Al$_2$O$_3$, 95.2% Fe$_2$O$_3$, 72.9% TiO$_2$, and 70.5% SiO$_2$. The sample without sulfur resulted in chlorination of 23.9% Al$_2$O$_3$, 88.6% Fe$_2$O$_3$, 75.5% TiO$_2$, and essentially zero SiO$_2$. These results demonstrate that the presence of sulfur increased the chlorination rate by 212% for Al$_2$O$_3$, 7% for Fe$_2$O$_3$, none for TiO$_2$, and a very large factor for SiO$_2$ (70.5% versus zero) under the conditions utilized. The following examples illustrate the use of ilmenite as a reactant in the present process. Ilmenite, FeTiO$_3$, can be chlorinated to produce ferric or ferrous chloride and titanium tetrachloride by either carbo-chlorination or displacement chlorination according to the stoichiometric equations given below:

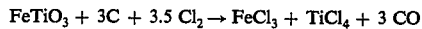

In the second equation, ferrous chloride could be converted to ferric chloride by simply adding free chlorine to the reaction.. At 1200° K the first equation has a free energy of about 31 130 Kcal and the second is about −60 Kcal. It would be expected that the above reactions of ilmenite would proceed rapidly. However, the chlorination rates were found to be slow and thus the following experimental results illustrated the unexpected increase in rate of reaction upon the addition of sulfur

EXAMPLE 29

A series of two carbo-chlorination reactions were carried out at 700° C in which ilmenite were mixed with 40% powdered carbon and was then reacted with pure chlorine in a horizontal tube reactor. The carbon-ilmenite mixtures weighed about 1 gram and the chlorine was flowed at 170cc/min for 15 minutes. Five percent sulfur by weight of ilmenite was added to the ore-carbon mixture in one test and not to the other. Without sulfur, the conversion of FeO and TiO$_2$ was 88.2% and 77.1%, respectively, and with sulfur the conversions were 95.99% and 100.0%, respectively. Thus, the presence of sulfur increased the FeO chlorination rate by 9% and the TiO$_2$ rate by about 30%. Substitution of hydrogen sulfide in Example 29 above produces similar unexpected results.

EXAMPLE 30

Ilmenite ore was reacted with SiCl$_4$ at 950° C for 30 minutes with and without sulfur. The sample was placed in a shallow boat in an externally heated horizontal tube furnace and SiCl$_4$ was flowed at 1 gram per minute. The test without sulfur gave 8.3% chlorination of FeO and no reaction of TiO$_2$ but with the addition of 5% sulfur to the reaction gave 91.7% FeO and 15.5% TiO$_2$ chlorination.

EXAMPLE 31

Aluminum phosphate samples containing 20% aluminum and 26% phosphorus as metal values were chlorinated in shallow boats placed in a horizontal tube furnace for 60 minutes using pure chlorine gas and powdered carbon as the reducing agent in a 50—50 weight ratio with the aluminum phosphate. To one sample, elemental sulfur was added equivalent to 5% by weight of the aluminum phosphate and to another sample no sulfur was added. The sample containing sulfur resulted in 98% Al and 100% P chlorination in 60 minutes, whereas the sample without sulfur resulted in 39% Al and 100% P chlorination.

To demonstrate that sulfur is acting as a catalyst in Example 31 above and not as a reducing agent, the following equation is given for illustration:

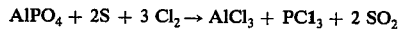

In the above equation, the sulfur must be added as 53% of the weight of aluminum phosphate, Thus, it must follow that the 5% sulfur added to the test given in Example 31 is not acting as a reducing agent, but rather, it functions solely or essentially as a reactant conditioner and/or a reaction promoter.

Certain other novel characteristics and features of the present process now become further apparent in light of the previous discussions and examples.

While not wishing to be bound by theory, it is believed the elemental sulfur is the active reaction promoter and/or reactant conditioner, however, with the realization that in those steps involving the use of chlorine or a chlorinating agent the sulfur could be operating through transitory chloride intermediates. It is known that in a chlorination reaction, the opportunity exists for the reaction of elemental sulfur with chlorine to form sulfur chlorides. Thus, factors depending on how the chlorination reaction is physically carried out and whether the net reaction is chlorine rich or chlorine starved will determine the extent to which the elemental sulfur is converted to a chloride form. Even in a chlorine starved reaction there will be at least some small amount of sulfur chlorides present in a transistory state due to the dynamic equilibrium of such chlorination reactions.

In any event, we have discovered that elemental sulfur (or its equivalent as defined herein) when employed in prechlorination heating or calcination under conditions as taught herein such that there is no reduction of the ore occurring, unexpectedly and remarkably increases the subsequent chlorination rates and degree. This unique result clearly demonstrates that sulfur alone (as defined herein) has an unique effect without exhibiting any reductant activity on materials like clay, to make them more completely and rapidly reactive in subsequent chlorination.

Similarly and unexpectedly pursuant to the present discovery, sulfur (as defined herein) when added to a displacement chlorination greatly accelerates the rate and degree of reaction; and here too, there is not involved any reduction with a reducing element, so the sulfur (or its equivalent) must stay intact or make a sulfur chloride.

Therefore, it is obvious in light of our discovery that sulfur exerts a strong beneficial effect on chlorinations entirely independently of its reducing properties, its sole use in the prior art teachings. We have also discovered that this unique property of sulfur (or its equivalent) is also effective in carbo-chlorination reactions, being effective in small amounts of inconsequential significance to the basic reduction reaction occurring. To further validate that observation, sulfur dioxide was the source of sulfur in Example 14 on carbo-chlorination. Sulfur dioxide is already oxidized so it could not be a reductant; but it gave results virtually as effective as the other sulfur containing compunds. Apparently, the carbon present reduced the sulfur dioxide to elemental sulfur which then functions in accordance with the present invention, not as a reductant but as a reaction promoter. Of course, some sulfur oxide might not contact the carbon and subsequently could escape the reaction zone, but that result would be only incidental and unimportant to the prime reaction-promoting function of the sulfur and, in any event, is merely a specific processing and/or equipment limitation which does not theoretically subtract from the unique advantages and features of our present discovery.

The aforementioned data are strongly indicative that elemental sulfur or sulfur chloride exerts the unique reaction-accelerating or conditioning property as discovered by us, but this invention is not to be construed as being limited in any manner whatsoever by or dependent on such theories of mechanism. Our invention stands on its own description and merit independently of any theory.

Sulfur containing compounds functionally equivalent to sulfur thus are clearly defined for the purposes of this invention as those which, when utilized as taught in the present process, result in increasing the reaction rate and yield of metal chloride values derived during ore chlorination reactions, to function substantially to the same degree as would elemental sulfur assuming that our mechanism presumptions are correct, and in the alternative, any member capable of accomplishing the basic benefits and advantages as observed and taught herein.

The present process(es) offer as a distinguishing feature the utilization of relatively short reaction times when viewed in perspective of the prior art of chlorination reactions involving similar ores, however, in the absence of sulfur reaction promoters and/or reactant conditioners. The benefit of such short reaction times, coupled with the significant yields realized hereby, renders the present process commercially attractive and introduces to the art a whole new area of commercial adaptable chemistry for the production of aluminum chloride and subsequently alumina from ordinary clay.

As to the proportion of the reactants, in a carbo-chlorination reaction the carbon and chlorine are preferably present at or near stoichiometric quantities, especially the chlorine in order to insure complete utilization of the chlorine. The amount of carbon used will preferably be within the range of from about 15% to about 50% by weight of the ore in excess of stoichiometric proportions. In the displacement process of the present invention, the metal chloride reactant is preferably present above stoichiometric proportions in order to insure driving the reaction to completion. By definition, an ore is a mineral from which the metal can be extracted profitability which points out a very salient feature and advantage of the present invention. Namely, by virtue of the present process metal values can now be recovered economically from many heretofore commercially unattractive ores, especially aluminous ores in the production of alumina by the carbo-chlorination process of the present invention and similarly from other ores and by displacement chlorination of other ores also. Heretofore to the present discovery, the aluminum industry has essentially been restricted to the commercial production of aluminum utilizing as a principal ore bauxite which comprises hydrated aluminum oxide, together with associated impurities, such as the oxides of iron, silicon and titanium. Typical bauxite ores usable for the current Bayer process contain about 50% to about 65% alumina which is extracted to make alumina and the latter electrolyzed to aluminum metal by the Hall process. By virtue of the present discovery, alumina can be economically made by the present invention from previously unusable aluminous ores, such as clay which generally is comprised of mainly kaolinite comprising for example, approximately 39% alumina, 46% silica, 14% water together with various impurities. Another advantage of this process utilizing clay is that it recovers the valuable titanium oxide in the clay along with the alumina, thus making two major industries independent of imported ores.

While the present process is directed primarily to the recovery of values from aluminous clays, many other ores can be similarly advantageously utilized pursuant hereto, for example, bauxite, hematite, ilmenite, aluminum phosphate and the like. The term ore also is intended to include refined or active aluminum oxides without the impurities usually found in crude ores.

One advantage of this process is that it can be conducted under conditions for which inert construction materials are available that will last and not contaminate the products. Another advantage of this process is its utility in a wide range of batch, semi-continuous or continuous processing apparatus such as rotary kilns and reactors; fluid, static or moving bed reactors; or horizontal conveyors, to best accommodate different ores.

The present process being primarily a dry process, the ore reactants may be prepared by either of two procedures. The ore may be first individually ground in a hammer mill, ball mill or other grinding device so as to achieve the desired particle size and then mixed with other solid reactants preparatory to its reaction. Conversely, the solid reactants may be first pre-mixed and then passed through a hammer mill, ball mill or other device to achieve the desired average particle size. The average particle size of the ore reactant should preferably be less than about 4 mm (7 mesh) and especially small enough to pass through 200 mesh. It is sometimes preferred to bind the reactants by addition of a suitable binder, e.g., starch, ligneous products, asphalt, or the like, preparatory to calcination. Generally, the binder is added in an amount of no more than 5% by weight of the ore; and the ore, sulfur and/or functionally equivalent sulfur compound, binder and carbon can be agglomerated in rolling drums or tables, or by briquetting to give consolidated particles of all reactants; and the particles so formed, then crushed to appropriate size for the calciner or chlorinator. The consolidation is important for ores that would gain from solid intimate contact of reactants. In some cases, the consolidation could advantageously be made after calcination but before chlorination.

It will be apparent to one skilled in the art that various changes and modifications can be made within the ambit of the present invention without departing from its true scope and spirit. For example, such parameters as its adaption to a continuous operation, the type of reaction equipment employed, the method of mixing the reactants, and the like, can vary. Accordingly, while we have described what we believe to be the best embodiments of our invention, we however, do not wish to be confined within those embodiments and the enumerated examples which are only illustrative of our invention and what we desire to cover by Letters Patent is as set forth in the appended claims.

We claim:

1. In a method of carbo-chlorinating clay to produce aluminum chloride and silicon chloride comprising the steps of: mixing and calcining clay and a solid carbonaceous reductant to form a reaction mass; and carbo-chlorinating the clay to produce aluminum chloride and silicon chloride by exposing the calcined reaction mass to a chlorinating agent; the improvement comprising the steps of: adding at least one sulfur containing member selected from the group consisting of elemental sulfur and functionally equivalent sulfur containing compounds to the clay and heating the at least one sulfur containing member and the clay before carbo-chlorination, with carbon being present in essentially stoichiometric proportion as the carbonaceous reductant; and adding at least one sulfur containing member consisting of elemental sulfur and functionally equivalent sulfur containing compounds to the calcined reaction mass and heating the at least one sulfur containing member and the clay during carbo-chlorination, the at least one sulfur containing member added before and during carbo-chlorination being present other than as a major reducing agent or reactant and in an amount to increase the yield and rate of formation of aluminum chloride and silicon chloride.

2. The method of claim 1 in which the at least one sulfur containing member added before carbo-chlorination is elemental sulfur.

3. The method of claim in which the at least one sulfur containing member added before carbo-chlorination is capable of thermal decomposition at or below 1000° C to produce elemental sulfur.

4. The method of claim 1 in which the at least one sulfur containing member added before carbo-chlorination is selected from the group consisting of metal thiosulfates and metal polysulfides.

5. The method of claim 1 in which the heating of the clay with the at least one sulfur containing member before carbo-chlorination is conducted at a temperature within the range of from about 400° C to about 1,000° C.

6. The method of claim 1 in which the at least one sulfur containing member added before carbo-chlorination is selected from the group consisting of metal polysulfides, metal thiosulfates, sulfur oxides, metal sulfites, metal sulfates and metal sulfoxy compounds.

7. The method of claim 1 in which the at least one sulfur containing member added during carbo-chlorination is selected from the group consisting of elemental sulfur, hydrogen sulfide, metal sulfides, metal polysulfides, metal thiosulfates, sulfur oxides, sulfur oxychlorides, metal sulfites, metal sulfates, sulfur chlorides and carbon sulfides.

8. The method of claim 1 in which the at least one sulfur containing member added during carbo-chlorination is elemental sulfur present in an amount less than about 30% by weight of the clay.

9. The method of claim 1 in which the temperature range for heating the at least one sulfur containing member added before carbo-chlorination with the clay and carbon and the temperature range of carbo-chlorination is from about 500° C to about 1000° C.

10. The method of claim 1 in which the chlorinating agent is chlorine.

* * * * *